United States Patent
Ahlgrimm et al.

(10) Patent No.: US 9,393,717 B2
(45) Date of Patent: Jul. 19, 2016

(54) METHOD FOR STARTING UP A PROCESSING PLANT FOR PRODUCING PLASTICS MATERIAL GRANULATE AND PROCESSING PLANT FOR PRODUCING PLASTICS MATERIAL GRANULATE

(71) Applicant: Coperion GmbH, Stuttgart (DE)

(72) Inventors: Michael Ahlgrimm, Besigheim (DE); Hans-Joachim Sämann, Bietigheim-Bissingen (DE); Klaus Kapfer, Leonberg (DE); Peter Munkes, Stuttgart (DE)

(73) Assignee: Coperion GmbH, Stuttgart (DE)

( * ) Notice: Subject to any disclaimer, the term of this patent is extended or adjusted under 35 U.S.C. 154(b) by 467 days.

(21) Appl. No.: 13/872,491

(22) Filed: Apr. 29, 2013

(65) Prior Publication Data

US 2013/0285276 A1 Oct. 31, 2013

(30) Foreign Application Priority Data

Apr. 30, 2012 (EP) ..................................... 12166130

(51) Int. Cl.
*B29C 47/30* (2006.01)
*B29B 9/06* (2006.01)
(Continued)

(52) U.S. Cl.
CPC . *B29B 9/06* (2013.01); *B29B 7/482* (2013.01); *B29B 9/065* (2013.01); *B29C 47/0872* (2013.01); *B29C 47/6031* (2013.01); *B29C 47/6056* (2013.01); *B29C 47/92* (2013.01); *B29C 47/0011* (2013.01); *B29C 47/0066* (2013.01); *B29C 47/30* (2013.01); *B29C 47/385* (2013.01); *B29C 47/402* (2013.01); *B29C 47/662* (2013.01); *B29C 47/864* (2013.01); *B29C 2793/0027* (2013.01); *B29C 2947/926* (2013.01); *B29C 2947/92019* (2013.01); *B29C 2947/92038* (2013.01); *B29C 2947/9238* (2013.01); *B29C 2947/92047* (2013.01);
(Continued)

(58) Field of Classification Search
None
See application file for complete search history.

(56) References Cited

U.S. PATENT DOCUMENTS 4,299,553 A * 11/1981 Swaroop ....................... 425/572
4,759,889 A 7/1988 Voss
(Continued)

FOREIGN PATENT DOCUMENTS

DE 102 00 192 A1 7/2003
DE 10 2004 002401 A1 8/2005

OTHER PUBLICATIONS

Fischer, Rechnersteuerung an Extrusionsanlagen, Kunststoffe, Bd. 74, Nr. 7, Jul. 1, 1984, pp. 362-366.
(Continued)

*Primary Examiner* — Jacob Thomas Minskey
(74) *Attorney, Agent, or Firm* — McGlew and Tuttle, P.C.

(57) ABSTRACT

In a processing plant for producing plastics material granulate, the start-up takes place in such a way that a screw machine is firstly driven by means of a drive device and then plastics material to be processed is fed by means of a metering device into the screw machine. At least one conveying position of the plastics material in the screw machine is determined by means of a control device by evaluating at least one measuring signal. Depending on the conveying position determined, a granulating device is activated and put into operation. The method according to the invention allows a direct start-up of the processing plant without the use of a start-up valve. This ensures an easy and safe start-up of the processing plant.

2 Claims, 8 Drawing Sheets

(51) Int. Cl.
  *B29C 47/08* (2006.01)
  *B29C 47/60* (2006.01)
  *B29C 47/92* (2006.01)
  *B29B 7/48* (2006.01)
  *B29C 47/00* (2006.01)
  *B29C 47/38* (2006.01)
  *B29C 47/40* (2006.01)
  *B29C 47/66* (2006.01)
  *B29C 47/86* (2006.01)

(52) U.S. Cl.
  CPC ............... *B29C 2947/92066* (2013.01); *B29C 2947/92095* (2013.01); *B29C 2947/9298* (2013.01); *B29C 2947/92104* (2013.01); *B29C 2947/92333* (2013.01); *B29C 2947/92457* (2013.01); *B29C 2947/92485* (2013.01); *B29C 2947/92561* (2013.01); *B29C 2947/92704* (2013.01); *B29C 2947/92828* (2013.01); *B29C 2947/92923* (2013.01); *B29C 2947/92961* (2013.01); *B29C 2947/92971* (2013.01)

(56) References Cited

U.S. PATENT DOCUMENTS 5,017,119 A * 5/1991 Tokoi ........................ 425/142
5,059,103 A * 10/1991 Bruckmann et al. ........... 425/67
5,098,635 A * 3/1992 Widmer ....................... 264/555

OTHER PUBLICATIONS

Schwab, Automatisierung von Kunststoffverarbeitungsmascinen mit Mikrorechnersystemen, Kunststoffe, Bd. 73, Nr. 11, Nov. 1, 1983, pp. 674-679.

* cited by examiner

METHOD FOR STARTING UP A PROCESSING PLANT FOR PRODUCING PLASTICS MATERIAL GRANULATE AND PROCESSING PLANT FOR PRODUCING PLASTICS MATERIAL GRANULATE

CROSS-REFERENCES TO RELATED APPLICATIONS

This application claims the priority of European Patent Application, Serial No. 12 166 130.0, filed Apr. 30, 2012, pursuant to 35 U.S.C. 119(a)-(d), the content of which is incorporated herein by reference in its entirety as if fully set forth herein.

FIELD OF THE INVENTION

The invention relates to a method for starting up a processing plant for producing plastics material granulate. Furthermore, the invention relates to a processing plant for producing plastics material granulate having a screw machine, an electric drive device for driving the screw machine, a metering device for feeding a plastics material to be processed into the screw machine, a granulating device arranged downstream of the screw machine in a conveying direction of the plastics material, wherein the granulating device comprises a valve for feeding granulating water, and a control device.

BACKGROUND OF THE INVENTION

A processing plant for processing plastics material is known from DE 102 00 192 A1, in which a start-up valve is provided for the start-up. The plastics material to be processed is melted in a screw machine and firstly discharged by means of the start-up valve at the beginning of the start-up process. The discharged plastics material arrives in a cooling basin filled with water, where it can cool down and then be disposed of. At the end of the start-up process, the start-up valve is switched over, so that the molten plastics material is no longer discharged, but arrives in a downstream discharge device. A discharge device of this type is generally a granulating device, which produces a plastics material granulate from the molten plastics material. The start-up known from the prior art by means of a start-up valve is disadvantageous as the plastics material discharged during the start-up process has to be laboriously disposed of and is also a substantial safety risk because of the high temperature.

An underwater pelletizer is known from U.S. Pat. No. 4,759,889 A, in which the control valve for the granulating water is activated via a timer depending on a signal of the extruder motor. As a backup the control valve is additionally and directly activated by a pressure transducer, which is located in the extrusion chamber. The known pelletizer is difficult to start up.

SUMMARY OF THE INVENTION

The invention is based on an object of providing a method for starting up a processing plant for producing plastics material granulate, which allows an easy and safe start-up process.

This object is achieved by a method for starting up a processing plant for producing plastics material granulate, comprising the following steps:

providing a processing plant having
   a screw machine,
   an electric drive device for the screw machine,
   a metering device for feeding a plastics material to be processed into the screw machine,
   a granulating device arranged downstream of the screw machine in
   a conveying direction of the plastics material, and
   a control device,
driving the screw machine by means of the drive device,
feeding the plastics material to be processed into the screw machine by means of the metering device,
determining at least one conveying position of the plastics material in the screw machine by evaluating at least one measuring signal determined for the processing plant by means of the control device, and
activating the granulating device depending on the at least one conveying position determined,
wherein a starting time $T_0$ for starting a predefined process for putting the granulating device into operation is determined with the aid of the at least one measuring signal by means of the control device and a valve of the granulating device for feeding granulating water is activated proceeding from the starting time $T_0$ at a time interval $T_W$. The processing plant is started up in a direct manner without a start-up valve. This means that the processing plant between the screw machine and the granulating device either has no start-up valve at all or an existing start-up valve, for example in existing processing plants, is not used for the start-up. The granulating device is preferably connected to the screw machine without the interposition of a start-up valve. When starting up the processing plant, it has to be ensured that the granulating device is properly started up and no operational disturbances occur. In particular, the molten and hot plastics material has to be introduced approximately simultaneously with the cooling granulating water into the granulating device while the granulating device is put into operation. If the plastics material is introduced too early, the plastics material gums up the cutting mechanism of the granulating device. On the other hand, if the plastics material is introduced too late, the plastics material solidifies in the nozzle openings of the perforated plate of the granulating device and clogs it up. In order to ensure that the granulating device is put into operation safely, at least one conveying position of the plastics material in the screw machine is determined during the start-up process in that at least one measuring signal determined for the processing plant is evaluated by means of the control device. Since the at least one conveying position of the plastics material in the screw machine is known, the granulating device can be activated in time dependency with the at least one conveying position. If the plastics material, for example, reaches a specific conveying position in the screw machine, a starting process or process for putting the granulating device into operation can be triggered by the control device and the granulating device can be accordingly activated. This ensures that the granulating device can also be started up without operational disturbances. The method according to the invention therefore ensures that the start-up process takes place easily and safely as a start-up valve is not required and the plastic material is removed by means of the granulating device during the start-up process, so no discharged, hot plastics material is present during the start-up process outside the processing plant.

Determining the starting time $T_0$ ensures that the granulating device is put into operation safely and in a predefined manner with respect to time. The starting time $T_0$ representing the beginning of a predefined putting into operation process is defined by the at least one measuring signal. Proceeding from the starting time $T_0$, various time intervals can be defined, in which individual components or mechanisms of the granulating device are activated. The time interval $\Delta T_W$ ensures that the granulating water arrives in the granulating device or on the perforated plate of the granulating device substantially simultaneously with the molten plastics material. As a result, it is ensured that the granulating device is put into operation safely, as the plastics material neither clogs up the nozzle openings of the perforated plate nor gums up the cutting mechanism or granulating blades of the granulating device.

A method, in which a cutting mechanism of the granulating device is activated proceeding from the starting time $T_0$ at a time interval $\Delta T_G$, ensures that the cutting mechanism and the granulating blades of the cutting mechanism do not overheat because of the friction on the perforated plate. For this purpose, it is necessary, in particular, for the granulating blades to not be moved against the perforated plate too early and rotate uncooled on the perforated plate.

A method, in which $\Delta T_W > \Delta T_G$ applies, ensures that the plastics material does not clog up the nozzle openings.

A method, in which an atomized spray is produced by means of a spray mechanism of the granulating device, simplifies the start-up and putting into operation of the granulating device. The spray mechanism allows early contact of the granulating blades with the perforated plate without the danger of overheating, so when the flow of plastics material through the perforated plate starts, plastics material granulates are immediately cut. The water quantity sprayed in is selected here such that the granulating blades do not overheat owing to the friction with the perforated plate but the perforated plate is only insubstantially cooled, so a freezing up or clogging of the nozzle openings is prevented. The plastics material granulates produced are cooled by the atomized spray and can be collected in the inlet region of the cutting or granulating hood.

A method, in which the spray mechanism is activated proceeding from the starting time $T_0$ at a time interval $\Delta T_S$, ensures that the granulating device is easily put into operation. The spray mechanism is activated in a predefined manner proceeding from the starting time $T_0$.

A method, in which $\Delta T_G > \Delta T_S$ applies, minimizes the danger of overheating.

A method, in which at least one of the time intervals $\Delta T_W$, $\Delta T_G$ and $\Delta T_S$ is determined depending on at least one of the state variables, shaft speed and metering rate, ensures that the granulating device is safely put into operation. Since the time interval or the time intervals $\Delta T_W$, $\Delta T_G$ and/or $\Delta T_S$ are determined depending on the current operating state of the processing plant or the screw machine, it is ensured that the plastics material, proceeding from the at least one determined conveying position, actually arrives at the granulating device or the perforated plate at the determined time. The time period, which the plastics material requires from the determined conveying position to the granulating device or the perforated plate, in particular, depends on the shaft speed of the screw machine and the metering rate of the metering device. By taking into account at least one of these state variables, the start-up process can be optimized.

A method, in which the starting time $T_0$ is defined by means of a first measuring signal and a second measuring signal characterizes a pressure produced by the plastics material at a specific conveying position, wherein when the second measuring signal exceeds a threshold value $W_p$, a time $T_1$ is determined by means of the control device and at least one activation variable from the group, starting time $T_0$, time interval $\Delta T_W$, time interval $\Delta T_G$ and the time interval $\Delta T_S$ is corrected with the aid of the time $T_1$ for a subsequent activation, ensures a save and reliable start-up. If the time $T_1$ differs from an estimated time, at which the melt front is to arrive at the perforated plate, a correction of the start-up process for a subsequent start-up of the processing plant can be carried out with the aid of the time $T_1$. For example, with the aid of the time $T_1$, the starting time $T_0$, the time interval $\Delta T_W$, the time interval $\Delta T_G$ and/or the time interval $\Delta T_S$ can be corrected.

A method, in which the at least one measuring signal characterizes a torque of the drive device and, when a threshold value $W_M$ is exceeded, the starting time $T_0$ is defined by means of the control device, in a suitable manner allows a starting time $T_0$ to be defined. During the start-up process, the torque delivered by the drive device is determined. The torque can either be measured directly, in that, for example, the delivered torque at at least one of the drive shafts is measured by means of at least one torque measuring mechanism. Alternatively, the torque delivered can be calculated if the processing plant has no torque measuring mechanism to measure the torque. For example, the torque can be calculated from the effective power consumed or the current of the drive device consumed. It is sufficient here if the delivered torque is determined qualitatively. If plastics material to be processed arrives in the screw machine after the start of metering and is melted and kneaded there, the torque required for driving the screw machine increases significantly. This increase in the torque is detected by means of a measuring signal, which characterizes the torque delivered by the drive device. This may, for example, be a torque measuring signal, an effective power measuring signal or a current measuring signal. If the measuring signal exceeds the predefined threshold value $W_M$, the melt front of the molten plastics material is located at a substantially known conveying position in the screw machine. Proceeding from the exceeding of the threshold value $W_M$ or the associated conveying position, the starting time $T_0$ can then be defined in order to start the process of putting the granulating device into operation. To define the starting point $T_0$, the threshold value $W_M$ can be compared with the measuring signal itself or with a signal derived therefrom, for example the time change in the measuring signal.

A method, in which the at least one measuring signal characterizes a pressure produced by the plastics material at a specific conveying position, easily allows the determination of the conveying position of the molten plastics material in the screw machine. For this purpose, the screw machine has at least one pressure measuring mechanism, which monitors the pressure at a specific conveying position in the processing part. When the melt front of the molten plastics material reaches the respective pressure measuring mechanism, the pressure increases, so it is possible to detect in the associated measuring signal the fact that the melt front has reached the associated conveying position. A plurality of pressure measuring mechanism is preferably arranged along the conveying direction in order to monitor the progress of the melt front along the conveying direction.

A method, in which, when a threshold value $W_p$ is exceeded, the starting time $T_0$ is defined by means of the control device, allows the starting time $T_0$ to be easily defined to start the predefined process for putting the granulating device into operation. If the measuring signal exceeds the threshold value $W_p$, this means that the melt front has reached the associated conveying position of the pressure measuring mechanism. Proceeding from the exceeding of the threshold value $W_p$, the starting time $T_0$ can be defined in an easy and safe manner. To define the starting time $T_0$, the threshold value $W_p$ can be compared with the measuring signal itself or with a signal derived therefrom, for example the time change in the measuring signal.

A method, in which, when a threshold value $W_p$ is exceeded, a time $T_1$ is determined by means of the control device and at least one activation variable from the group, starting time $T_0$, time interval $\Delta T_W$, time interval $\Delta T_G$ and the time interval $\Delta T_S$ is corrected with the aid of the time $T_1$ for a subsequent activation, ensures a safe and reliable start-up. If the processing plant has a pressure measuring mechanism, this can be used to optimize the start-up process of the processing plant or the process of putting the granulating device into operation. For this purpose, the starting time $T_0$ is defined in the described manner by means of a measuring signal, which characterizes the delivered torque of the drive device, or by means of a measuring signal, which characterizes the pressure at a determined conveying position. A further pressure measuring mechanism is arranged close to the perforated plate, preferably directly before the perforated plate, so that the time $T_1$, at which the melt front actually arrives at the pressure measuring mechanism or on the perforated plate, can be determined by means of the associated measuring signal. If the time $T_1$ differs from an estimated time, at which the melt front is to arrive at the perforated plate, a correction of the start-up process for a subsequent start-up of the processing plant can be carried out with the aid of the time $T_1$. For example, with the aid of the time $T_1$, the starting time $T_0$, the time interval $\Delta T_W$, the time interval $\Delta T_G$ and/or the time interval $\Delta T_S$ can be corrected.

The invention is furthermore based on the object of providing a processing plant for producing plastics material granulate, which allows a simple and safe start-up process.

This object is achieved by a processing plant, in which the control device is configured in such a way that the screw machine is drivable by means of the drive device,
the metering device is activatable to feed plastics material to be processed into the screw machine,
at least one conveying position of the plastics material in the screw machine is determinable by evaluating at least one measuring signal determined for the processing plant, and
the granulating device is activatable depending on the at least one determined conveying position, wherein a starting time $T_0$ for starting a predefined process for putting the granulating device into operation is determinable with the aid of the at least one measuring signal by means of the control device and the valve for feeding granulating water is activatable proceeding from the starting time $T_0$ at a time interval $\Delta T_W$.

The advantages of the processing plant according to the invention correspond to the advantages already described of the method according to the invention. The processing plant or the control device may, in particular, be developed by the method according to the invention.

A processing plant, in which the drive device has at least one measuring mechanism to determine the at least one measuring signal, the at least one measuring signal characterizing a torque of the drive device, ensures the determination of the at least one conveying position of the plastics material in a simple manner. For direct measurement of the torque delivered by the drive device, the at least one measuring mechanism may, for example, be configured as a torque measuring mechanism. Alternatively, the at least one measuring mechanism may be configured in such a way that the torque delivered by the drive device can be calculated from the at least one measuring signal. For this purpose, the measuring mechanism may, for example, be configured as an effective power measuring mechanism or as a current measuring mechanism.

A processing plant, in which at least one pressure measuring mechanism is provided to determine the at least one measuring signal, the at least one measuring signal characterizing a pressure produced by the plastics material at a specific conveying position, in a simple manner, ensures the determination of a specific conveying position of the plastics material. If, with the aid of the associated measuring signal, an increase in the pressure is detected, the melt front of the molten plastics material has reached the conveying position associated with the pressure measuring mechanism. Proceeding from the detected conveying position, the granulating device is then activated.

A processing plant, in which the granulating device has a spray mechanism to produce an atomized spray, ensures a simple start-up process. Owing to the spray mechanism, the granulating blades can be moved early and without the danger of overheating onto the perforated plate. The quantity of water sprayed in ensures that the granulating blades do not overheat owing to the friction with the perforated plate but that the perforated plate is not significantly cooled, so the nozzle openings are prevented from freezing up or clogging. The plastic material granulates produced are cooled by the atomized spray.

Further features, advantages and details of the invention emerge from the following description of a plurality of embodiments.

DESCRIPTION OF THE PREFERRED EMBODIMENTS

Figure 1:
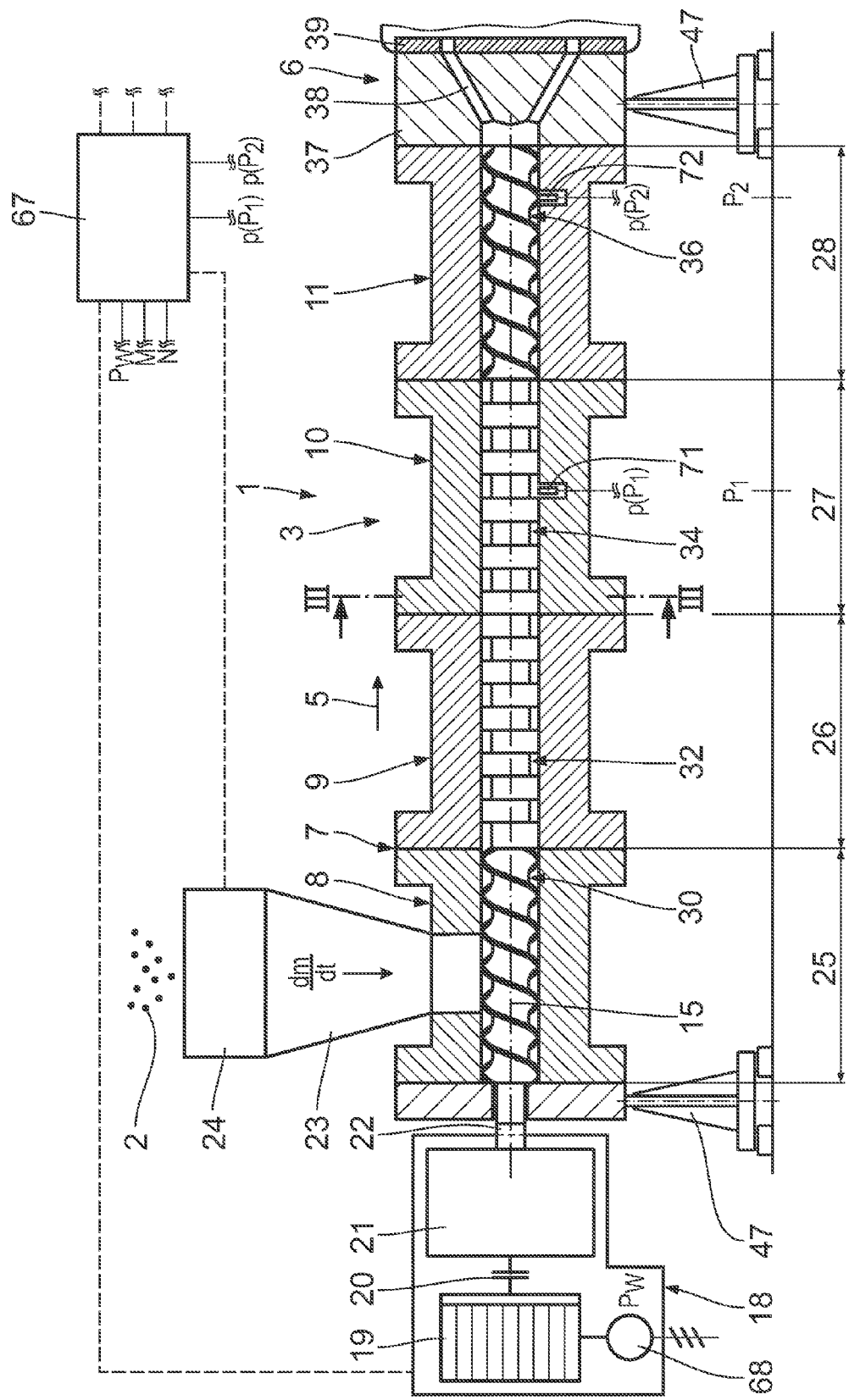
FIG. 1 shows a schematic and partially sectional view of a processing plant for producing plastics material granulate with a twin-shaft screw machine and a granulating device.
Figure 2:
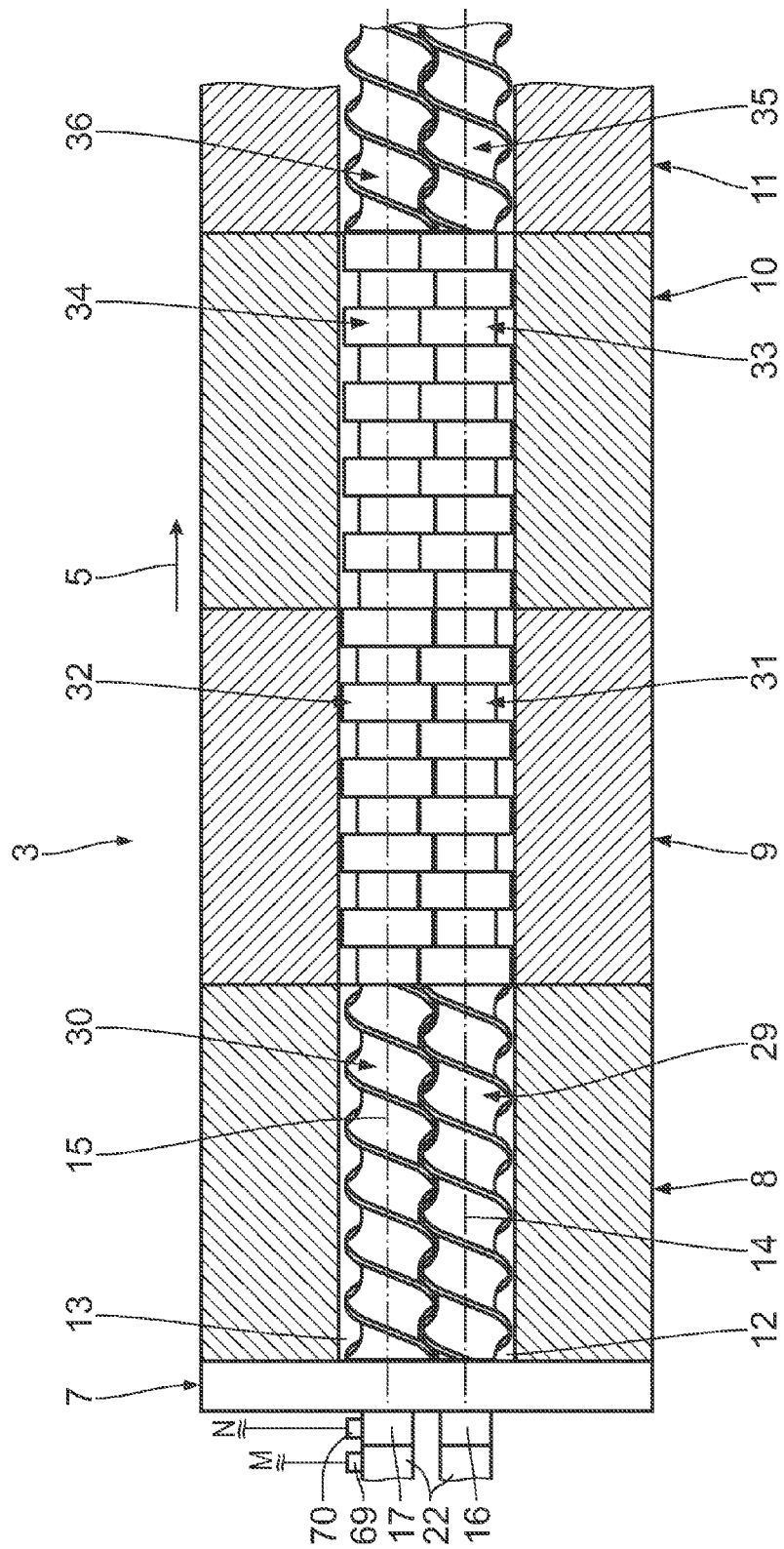
FIG. 2 shows a plan view of the sectionally shown twin-shaft screw machine in FIG. 1.
Figure 3:
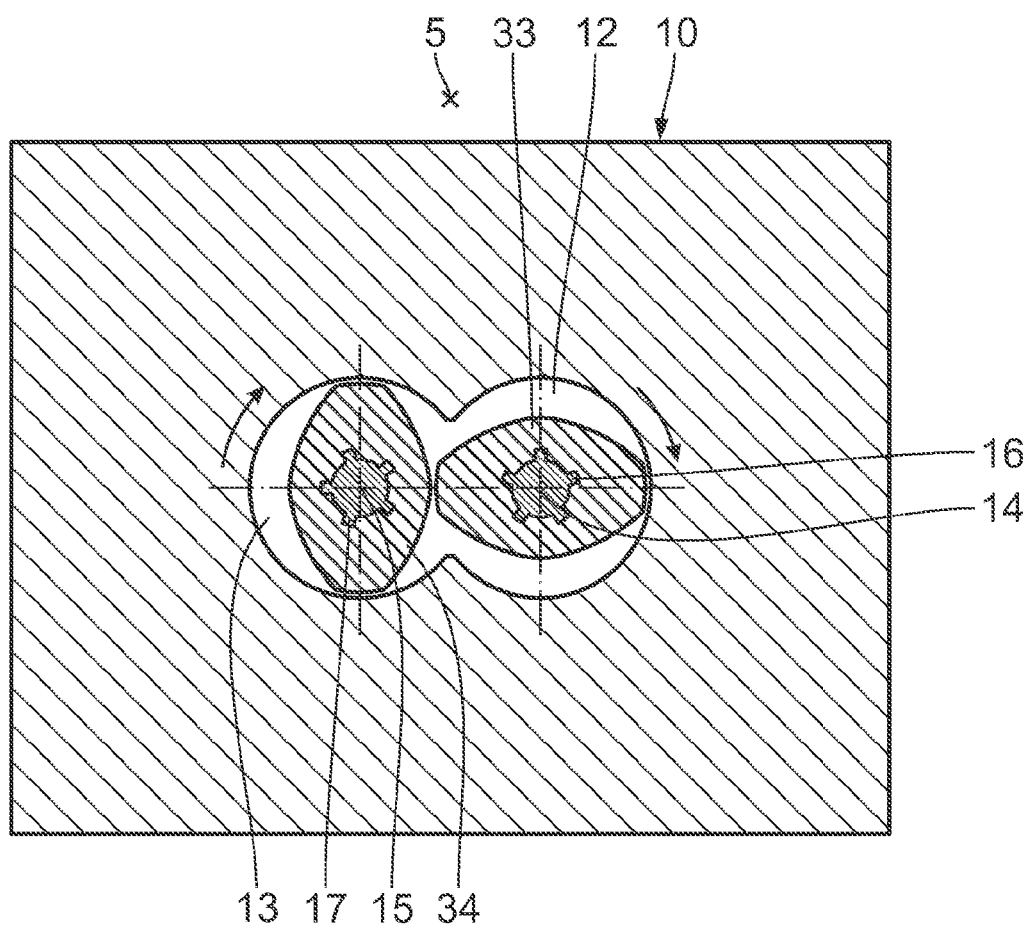
FIG. 3 shows a cross section through the twin-shaft screw machine along the section line III-III in FIG. 1.

A first embodiment of the invention is described below with the aid of FIGS. 1 to 6. A processing plant 1 has a twin-shaft screw machine 3 to process plastics material 2 and a granulating device 6 arranged downstream of the screw machine 3 in a conveying direction 5 of the plastics material 2 to produce plastics material granulate 4 from the processed plastics material 2.

The twin-shaft screw machine 3 comprises a housing 7 made of a plurality of housing portions 8, 9, 10, 11 arranged one behind the other and called housing sections. In the housing 7 is a first housing bore 12 and a second housing bore 13 passing through the latter, the associated axes 14, 15 of which run parallel to one another. The housing bores 12, 13 cross sectionally have the form of a horizontal eight.

Arranged in the housing bores 12, 13 concentrically in relation to the respective associated axis 14, 15 are shafts 16, 17, which can be rotatably driven by means of an electric drive device 18. The drive device 18 has an electric drive motor 19, which is coupled by a coupling 20 to a branch gearing 21. The branch gearing 21 has two drive shafts 22, which are coupled to the shafts 16, 17. The shafts 16, 17 are driven in a co-rotating manner, in other words in the same rotational directions about the axes 14, 15. The axes 14, 15 are accordingly also called rotational axes below.

Arranged on the first housing portion 11 adjacent to the branch gearing 21 is a material feed 23 in the form of a funnel, through which the plastics material 2 to be processed can be fed into the housing bores 12, 13 by means of a metering device 24. The plastics material 2 is conveyed in the conveying direction 5 from the first housing portion 8 to the last housing portion 11 through the housing 7. The screw machine 3 has, one behind the other in the conveying direction 5, an infeed zone 25, a melting zone 26, a mixing zone 27 and a discharge zone 28. Arranged on the shafts 16, 17 configured as spliced shafts are—one behind the other in the conveying direction 5—in each case associated with one another pairwise, first screw elements 29, 30, first kneading elements 31, 32, second kneading elements 33, 34 and second screw elements 35, 36, in each case arranged as treatment elements. Both the screw elements 29, 30, 35, 36 and the kneading elements 31, 32, 33, 34 engage in one another, in other words tightly mesh.

The granulating device 6 is configured as an underwater granulating device. The granulating device 6 has a granulating head housing 37, which is fastened at the end of the housing 7. Formed in the granulating head housing 37 is at least one channel 38, through which the plastics material 2, which is molten and is to be granulated, is fed to a perforated plate 39, said perforated plate being attached on the side of the granulating head housing 37 remote from the housing 7. Also attached to the granulating head housing 37 is a first granulating part hood 40 of a granulating hood 41. The granulating head housing 37 is thus used as a carrier for the perforated plate 39 and the first granulating part hood 40. The perforated plate 39 has a large number of nozzle openings not designated in more detail.

A feed line 42 for granulating water opens into the granulating part hood 40 in the lower region thereof. The granulating water introduced into the granulating hood 41 is discharged again by means of a discharge line 43, which opens out in the upper region of the granulating part hood 40. The granulating water flow is controlled by a valve 45 arranged in the feed line 42. The valve 44 is only shown schematically in FIGS. 4 and 5. The discharge line 43 opens out of the granulating part hood 40 behind the perforated plate 39 in relation to the conveying direction 5. An outlet tube 45, in which an outlet valve 46 is located to let out the granulating water, branches off in the region of the mouth of the feed line 42 into the granulating part hood 40 from the latter. The screw machine 3, the associated drive device 18 and the hitherto described part of the granulating device 6 are stationarily arranged and fastened by means of supports 47 on a base.

The as yet undescribed part of the granulating device 6 is arranged on a carriage 48, which can be moved on rails 51 in a longitudinal direction 49 by means of a drive motor 50. Arranged on the carriage 48 is a granulating drive motor 52, which, by means of a coupling 53, drives a blade shaft 54, which is rotatably mounted in a blade shaft bearing 55. Non-rotatably attached to the end of the blade shaft 54 facing the perforated plate 39 is a blade head 56, which serves as a blade holder, granulating blades 57 projecting radially outwardly being exchangeably fastened to the side of said measuring head facing the perforated plate 39.

Figure 4:
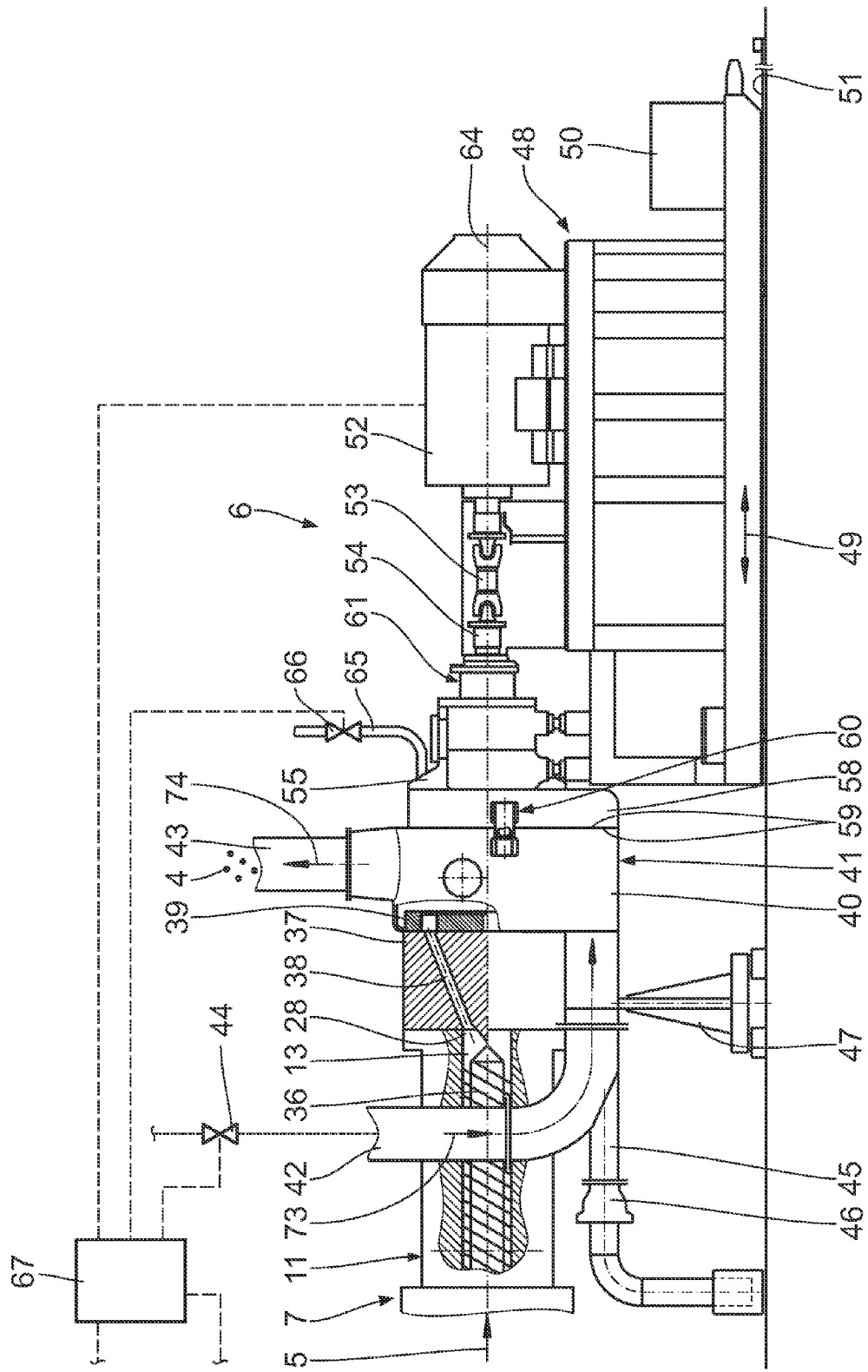
FIG. 4 shows a schematic view of the granulating device with a closed granulating hood.
Figure 5:
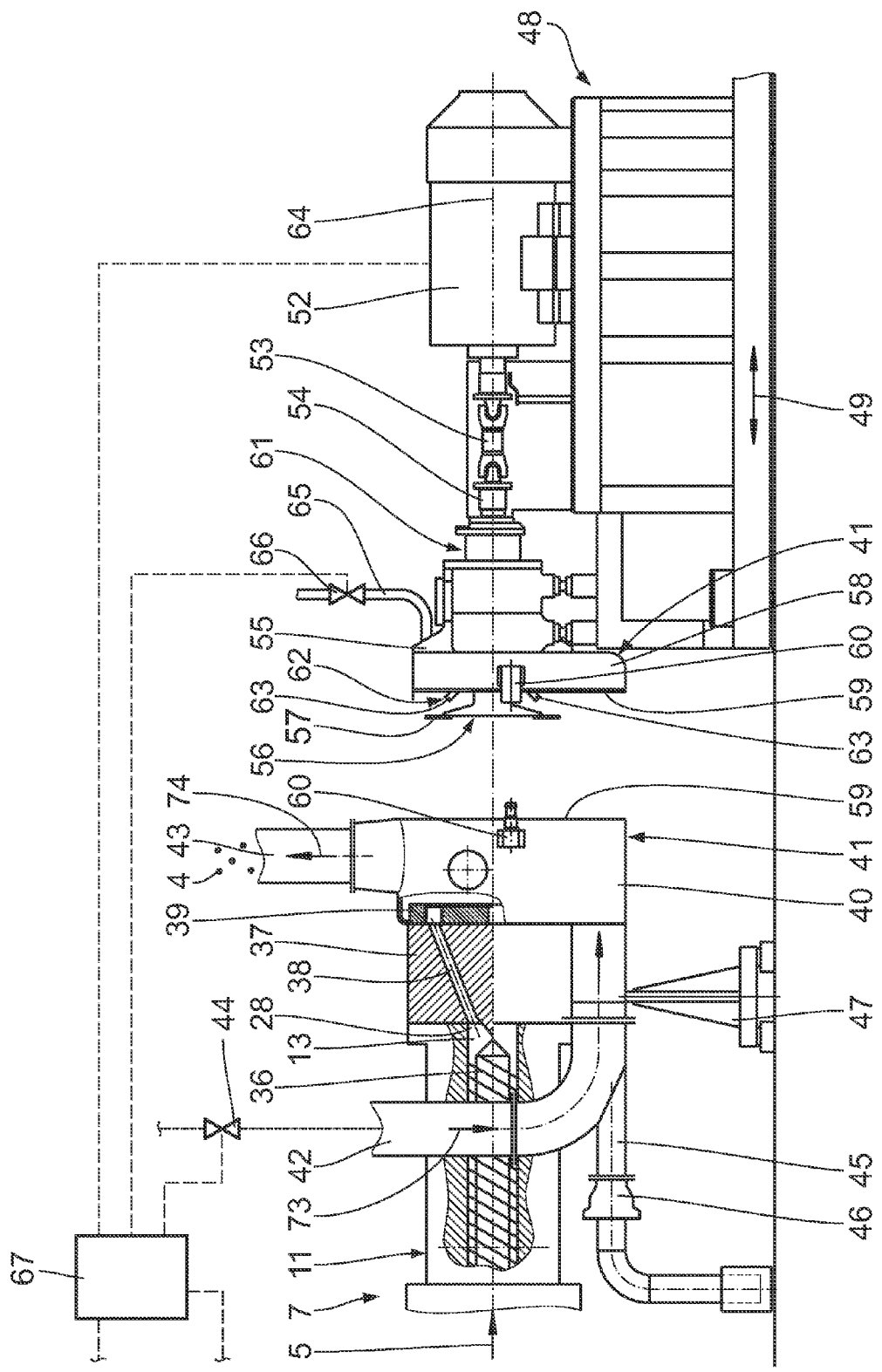
FIG. 5 shows a schematic view of the granulating device with an opened granulating hood.

Fastened to the side of the blade shaft bearing 55 facing the perforated plate 39 is a second granulating part hood 58, which, together with the first granulating part hood 40, forms the granulating hood 41. The granulating part hoods 40, 58 have mutually adapted contact faces 59, which rest closely against one another when the granulating device 6 is brought together. This is shown in FIG. 4. The granulating part hoods 40, 58 can be locked in the state in which they are brought together by means of a locking mechanism 60.

The granulating drive motor 52, the coupling 53, the blade shaft 54 with the blade shaft bearing 55 and the measuring head 56 with the granulating blades 57 fastened thereon form a cutting mechanism 61, which cuts the plastics material strands pressed through the perforated plate 39 and thus produces the plastics material granulate 4.

To put the granulating device 6 into operation, the latter has a spray mechanism 62 with a plurality of spray nozzles 63. The spray nozzles 63 are arranged distributed about a rotational axis 64 of the cutting mechanism 61 on the blade shaft bearing 55 and oriented in the direction of the granulating blades 57. The spray nozzles 63 are supplied with spray water by means of a feed line 65. A valve 66, which is used to control the feeding of the spray water, is arranged in the feed line 65.

To control the processing plant 1, said plant has a control device 67, which, for control, has a signal connection to the granulating device 6, the drive device 18 and the metering device 24. The control device 67 in particular controls the drive motors 19, 50 and the granulating drive motor 52 and the valves 44, 66.

To control the start-up process and the operation of the processing plant 1, various measuring sensors are provided, which have a signal connection to the control device 67 and provide various measuring signals to control the processing plant 1. The drive device 18 has an effective power measuring mechanism 68, which is used to measure the effective power $P_W$ consumed by the drive device 18. Moreover, the processing plant 1 has a torque measuring mechanism 69 and a speed measuring mechanism 70, which are arranged between the drive device 18 and the screw machine 3. The torque measuring mechanism 69 is used to measure the torque M of the drive shafts 22, whereas the speed measuring mechanism 70 is used to measure the shaft speed N of the drive shafts 22 or of the shafts 16, 17. In addition, two pressure measuring mechanisms 71, 72 are guided into one of the housing bores 12, 13 in the region of the housing portions 10 and 11. The pressure measuring mechanisms 71, 72 measure the pressure p in the processing part of the screw machine 3 at the conveying position $P_1$ or $P_2$. The pressure measuring mechanisms 71, 72 are, for example, configured as pressure switches.

Figure 6:
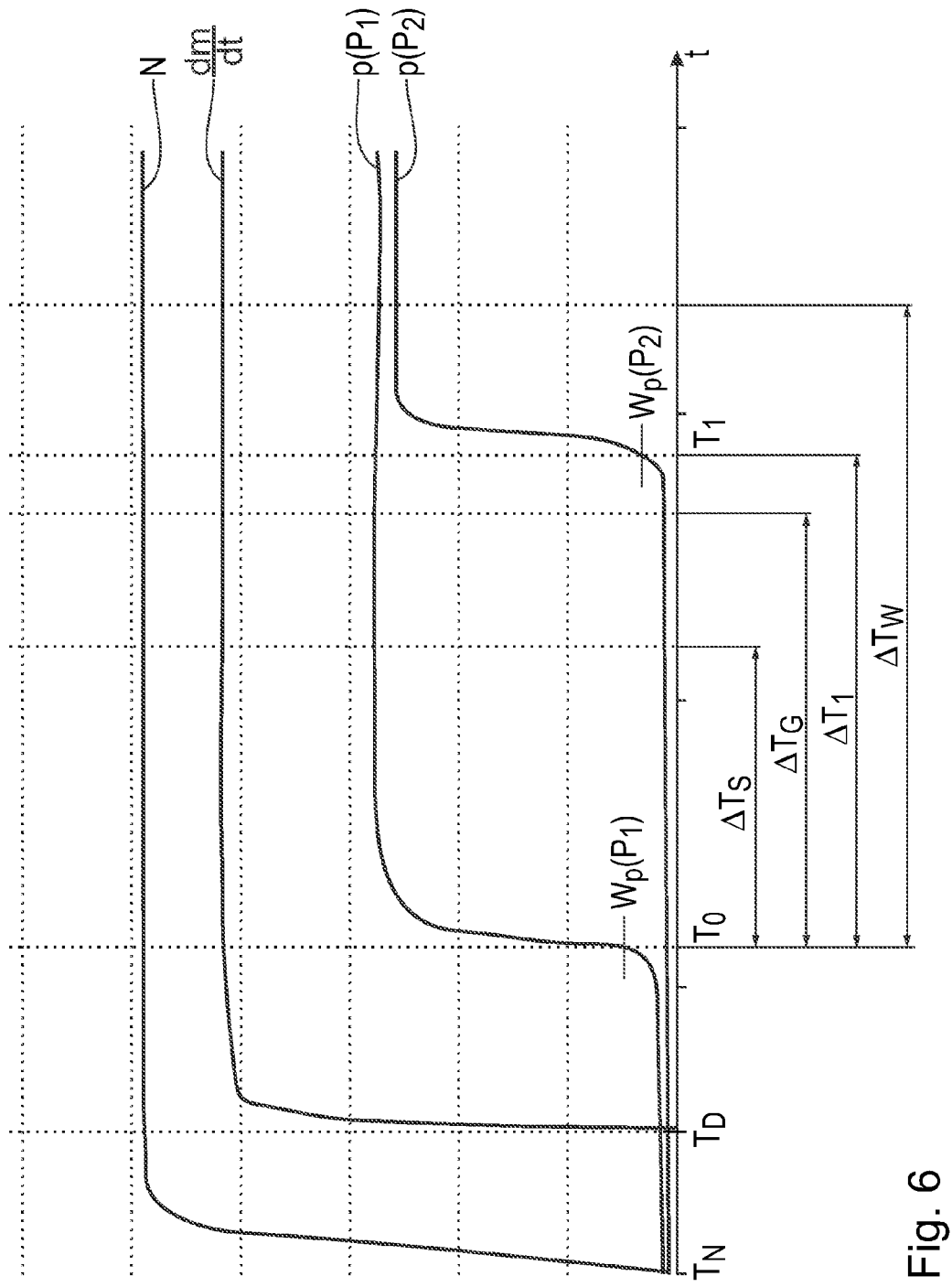
FIG. 6 shows a time view of a start-up process of the processing plant according to a first embodiment.

A start-up process according to a first embodiment will be described below with the aid of FIG. 6. The processing plant 1 is in an emptied state. This means that there is no plastics material 2 in the screw machine 3. The screw machine 3 is firstly started up. For this purpose, the shafts 16, 17 are rotationally driven in the same direction by means of the drive device 18 from the time $T_N$. The shaft speed N is measured by means of the speed measuring mechanism 70 and the associated measuring signal is transmitted to the control device 67. The measuring signal corresponding to the shaft speed N is designated N in FIG. 6.

The plastics material 2 to be processed is then fed by means of the metering device 24. For this purpose, the metering device 24, which feeds plastics material 2 to be processed at an adjustable metering rate dm/dt through the material feed 23 into the screw machine 3, is started at the time $T_D$. The metering rate is designated dm/dt in FIG. 6.

The fed plastics material 2 is now conveyed through the infeed zone 25 into the melting zone 26 and melted there. The plastics material 2 melted in the melting zone 26 then arrives in the mixing zone 27, where an intensive mixing and homogenizing of the plastics material 2 takes place. If the melt front of the plastics material 2 reaches the conveying position $P_1$, the pressure p in the housing bores 12, 13 increases at the conveying position $P_1$, which can be measured by means of the pressure measuring mechanism 71. The measuring signal belonging to the pressure measuring mechanism 71 is designated $p(P_1)$ in FIG. 6. The measuring signal $p(P_1)$ is evaluated in the control device 67 and compared with a threshold value $W_p(P_1)$. If, for the measuring signal, there applies $p(P_1) \geq W_p(P_1)$, this means that the melt front has reached the conveying position $P_1$. The associated time is defined by the control device 67 as the starting time $T_0$, from which a predefined process is started for putting the granulating device 6 into operation.

Proceeding from the starting time $T_0$, the spray mechanism 62 or the valve 66 of the spray mechanism 62 is firstly activated at a time interval $\Delta T_S$, so the spray nozzles 63 produce an atomized spray in the granulating hood 41. Furthermore, proceeding from the starting time $T_0$ at a time interval $\Delta T_G$, the cutting mechanism 61 of the granulating device 6 is activated and the granulating blades 57 lying against the perforated plate 39 are rotatably driven about the rotational axis 64 by means of the granulating drive motor 52. $\Delta T_G > \Delta T_S$ preferably applies. The rotating granulating blades 57 are cooled by the atomized spray produced to such an extent that they do not overheat because of the friction with the perforated plate 39. When the hot plastics material 2 reaches the perforated plate 39, plastics material strands are produced after the perforated plate 39 in the usual manner and are cut to form plastics material granulate 4 by means of the granulating blades 57. As the perforated plate 39 is only slightly cooled by means of the atomized spray, the nozzle openings of the perforated plate 39 do not clog. The plastics material granulate 4 is cooled by the atomized spray and collects in the infeed region of the granulating hood 41. Proceeding from the starting time $T_0$ at a time interval $\Delta T_W$, the valve 44 is activated and the granulating water is introduced into the granulating hood 41 through the feed line 42 in a feed direction 73. There preferably applies: $\Delta T_W > \Delta T_G$. The granulating water is deflected upwardly in the granulating hood 41 and entrains the plastics material granulate 4 located in the inlet region because of the start-up process and the plastics material granulate 4 produced on the perforated plate 39 by means of the granulating blades 57. The granulate/water mixture is then discharged through the discharge line 43 in a discharge direction 74.

The respective time interval $\Delta T_S$, $\Delta T_G$ and/or $\Delta T_W$ is predefined in the control device 67 and is preferably calculated before the starting time $T_0$ depending on the shaft speed N and/or the metering rate dm/dt. The calculation takes place qualitatively in such a way that the respective time interval $\Delta T_S$, $\Delta T_G$, $\Delta T_W$ is all the smaller, the greater the shaft speed N and/or the greater the metering rate dm/dt.

When the melt front of the plastics material 2 reaches the conveying position $P_2$, the pressure $p(P_2)$ in the housing bores 12, 13 at the conveying position $P_2$ increases. The measuring signal belonging to the pressure measuring mechanism 72 is designated $p(P_2)$ in FIG. 6. The measuring signal $p(P_2)$ is fed to the control device 67, which compares it with a threshold value $W_p(P_2)$. If, for the measuring signal, there applies $p(P_2) \geq W_p(P_2)$, this means that the melt front of the plastics material 2 has reached the conveying position $P_2$. The control device 67 defines the associated time as $T_1$ and determines an associated time interval $\Delta T_1$ between the starting time $T_0$ and the time $T_1$.

Since the respective time interval $\Delta T_S$, $\Delta T_G$ and $\Delta T_W$ is based on an estimated progress speed of the melt front and the estimated progress speed can deviate from the actual progress speed, a subsequent start-up process can be optimized by means of the time $T_1$ or the time interval $\Delta T_1$ in that the respective time interval $\Delta T_S$, $\Delta T_G$ and/or $\Delta T_W$ is adapted depending on $T_1$ or $\Delta T_1$ in order to optimize the start-up process.

Figure 7:
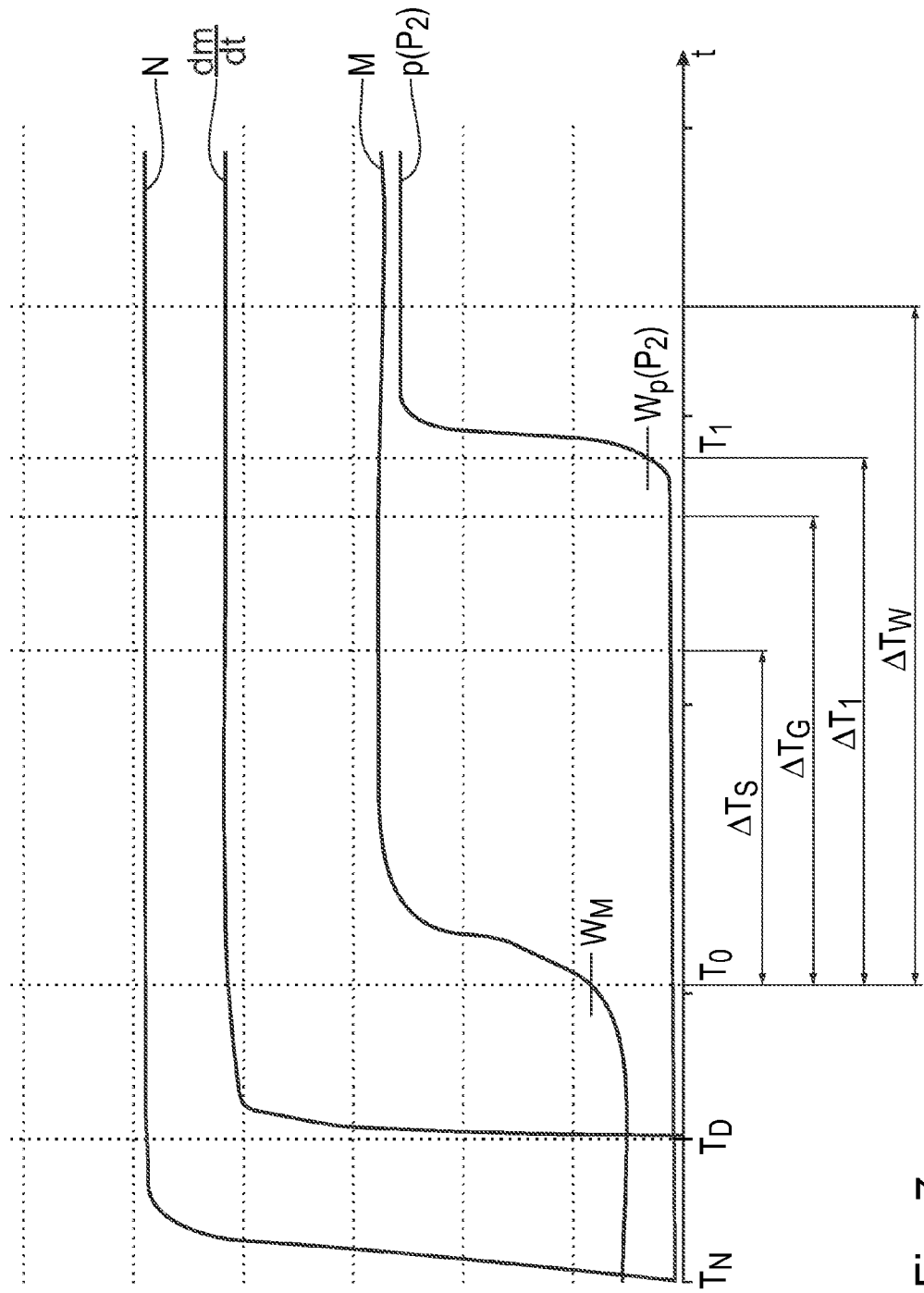
FIG. 7 shows a time view of a start-up process of the processing plant according to a second embodiment.

A second embodiment of the invention is described below with the aid of FIG. 7. In contrast to the first embodiment, the processing plant 1 only has the pressure measuring mechanism 72 at the conveying position $P_2$ but not the pressure measuring mechanism at the conveying position $P_1$. The conveying position $P_1$ can therefore no longer be directly measured, but has to be estimated during the start-up process. For this purpose, the measuring signal of the torque measuring mechanism 69 is evaluated in the control device 67. The measuring signal belonging to the torque measuring mechanism 69 is designated M in FIG. 7. When the fed plastics material 2 is melted in the melting zone 26 and homogenized in the mixing zone 27, the torque M required to maintain the speed N increases significantly. The increase in the torque M is detected by means of the measuring signal M in that the measuring signal M is compared with a threshold value $W_M$. When, for the measuring signal, there applies $M \geq W_M$, this is interpreted by the control device 67 in such a way that the melt front has reached the conveying position $P_1$. The control device 67, in the manner already described, defines the starting point $T_0$ from which the respective time interval $\Delta T_S$, $\Delta T_G$ and $\Delta T_W$ begins to run. As the reaching of the conveying position $P_1$ can only be estimated with the aid of the torque M, the correction of the activating variables $T_0$, $\Delta T_S$, $\Delta T_G$ and/or $\Delta T_W$ by means of the time $T_1$ or the time $\Delta T_1$ becomes very important. Since only one pressure measuring mechanism 72 is required, the processing plant 1 has a simple and reliable structure. With regard to the further structure and further mode of functioning of the processing plant 1, reference is made to the first embodiment.

Figure 8:
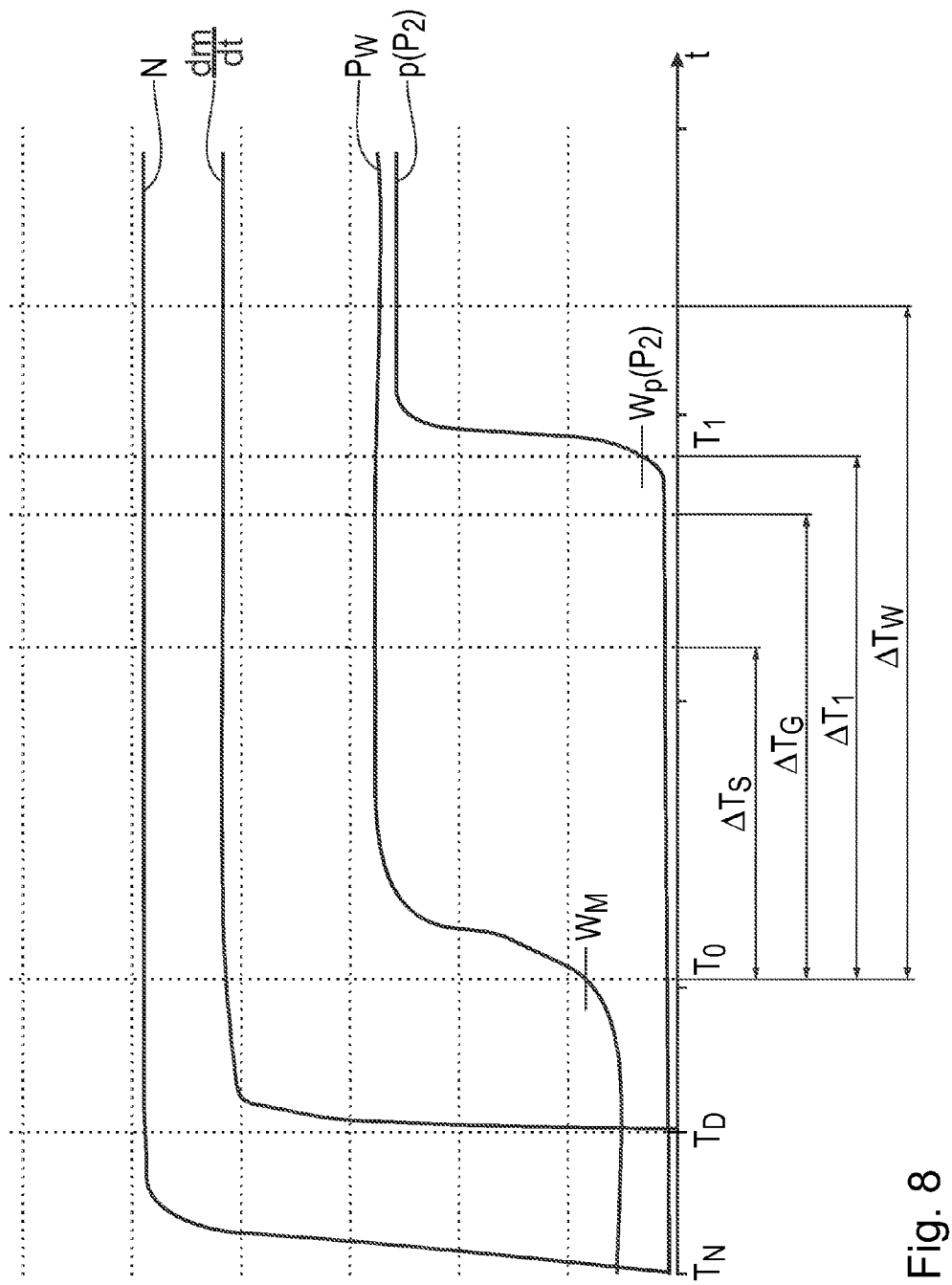
FIG. 8 shows a time view of a start-up process of the processing plant according to a third embodiment.

A third embodiment of the invention will be described below with the aid of FIG. 8. In contrast to the first embodiment, the processing plant 1 only has the pressure measuring mechanism 72 at the conveying position $P_2$, but no pressure measuring mechanism at the conveying position $P_1$. Moreover, the processing plant 1 has no torque measuring mechanism for directly measuring the torque M provided by the drive device 18. The reaching of the conveying position $P_1$ is determined by means of the effective power $P_W$ consumed by the drive device 18. As the rotational speed N after the start-up of the drive device 18 is substantially constant, the consumed effective power $P_W$ qualitatively corresponds to the torque M provided by the drive device 18. The effective power $P_W$ consumed is measured by means of the effective power measuring mechanism 68 and the associated measuring signal is fed to the control device 67. The measuring signal belonging to the effective power measuring mechanism 68 is designated $P_W$ in FIG. 8. The measuring signal $P_W$ is evaluated by means of the control device 67 and compared with the threshold value $W_M$. If, for the measuring signal, there applies $P_W \geq W_M$, this is interpreted by the control device 67 in such a way that the melt front has reached the conveying position $P_1$. The control device 67 defines the starting time $T_0$ in the manner already described. Proceeding from the starting time $T_0$, the granulating device 6 is put into operation in the described manner. Since no torque measuring mechanism 69 is required, the processing plant 1 has a simplified structure. Reference is made to the previous embodiments with regard to the further structure and the further mode of functioning of the processing plant 1.

A simple and safe start-up is possible with the processing plant 1 according to the invention and the method according to the invention. The start-up takes place in a direct manner without a start-up valve or without the use of an existing start-up valve. The start-up is exclusively controlled by the analysis of measuring signals of the processing plant 1 in the processing plant 1 according to the invention and the method according to the invention, so that after the start of metering, the flow of the plastics material 2 in the direction of the perforated plate 39 can be determined and this means that the flow of the plastics material 2 through the perforated plate 39, the abutment and rotation of the granulating blades 57 on the perforated plate 39 and the feed of the granulating water into the cutting or granulating hood 41 take place in the desired time sequence. This ensures that the functioning of a start-up valve is not required and this can accordingly be dispensed with.

The time intervals $\Delta T_S$, $\Delta T_G$ and $\Delta T_W$ predefined in the control device 67 are preferably defined depending on the plastics material 2 to be processed and the formulation. By means of the pressure measuring mechanism 72, the start-up of the processing plant 1 or the granulating device 6 can be continuously improved depending on the plastics material 2 and the formulation, so less plastics material granulate waste is produced during a subsequent optimized start-up process. The pressure measuring mechanism 72 is preferably arranged as close as possible to the perforated plate 39. This may, for example, be at the end of the last housing portion 11—as shown in FIG. 1—or in the granulating head housing 37 directly before the perforated plate 39, in order to measure the pressure in one of the channels 38. As the localization of the melt front is all the more easily possible, the more viscous the molten plastics material 2, viscosity-reducing materials to optionally be mixed in, such as, for example, peroxide, are firstly added after the successful start-up of the granulating device 6.

The method according to the invention can also be applied when using a melt pump arranged downstream of the screw machine 3 to increase the pressure, as, owing to the time-controlled start-up process of this melt pump, the residence time of the melt front before the granulating device 6 is only extended by a specific time period, this time period being able to be additively taken into account when the granulating device 6 is put into operation. The method according to the invention can be used for all polymers, in particular in polypropylene, polyethylene, styrene-butadiene rubber or similar styrene polymers or butadiene copolymers, which can be cut in an underwater granulating device.

In principle, the time course of the melt front can be monitored with any number of pressure measuring mechanisms, which are installed along the processing part of the screw machine 3, an optionally present melt pump and/or screening device and in the granulating head housing 37 directly before the perforated plate 39. Subsequent start-up processes can be automatically optimized by the correction of the activating variables and adapted to changing states, which may, for example, be produced by a screen change, a perforated plate change or wear to the treatment elements.

The method according to the invention can also be used in a granulating device 6 without a spray mechanism. In order to prevent the freezing up or clogging of the nozzle openings in the perforated plate 39, it has to be ensured by the predefined putting into operation process that a minimum flow of the plastics material 2 through the perforated plate 39 already takes place before the granulating water enters the granulating hood 41. The time interval $\Delta T_w$ therefore has to be selected such that the granulating water enters the granulating hood 41 within a desired time range once the plastics material 2 has reached the perforated plate 39. The start-up process can be simplified by the spray mechanism 62 and a formation of plastics material agglomerates on the granulating blades 57 can be reliably avoided. The spray mechanism 62 allows early contact of the granulating blades 57 with the perforated plate 39 and ensures that when the flow of plastics material 2 starts, plastics material granulates 4 are immediately cut and cooled in the atomized spray. The quantity of water sprayed in is selected here in such a way that the granulating blades 57 do not overheat owing to the friction with the perforated plate 39 but the perforated plate 39 is not significantly cooled in order to avoid the nozzle openings freezing up. The drive motor 50, which moves the granulating blades 57 in the direction of the perforated plate 39 until they rest on the perforated plate 39, is activated together with the activation of the spray mechanism 62. The activation of the spray mechanism 62 or the cutting mechanism 61 should take place a few seconds before the arrival of the melt front at the perforated plate 39. Optionally, the spray mechanism 62 can already be activated with the start-up of the drive device 18 in the case of low-viscosity polymer melts.

When there is a product change, the processing plant 1 firstly has to be emptied for a renewed start-up.

The method according to the invention can be used in any screw machines, such as, for example, in multi-shaft extruders or twin-shaft extruders, which rotate in the same direction and tightly mesh, in single-shaft extruders or in continuous mixers.

What is claimed is:

1. A processing plant for producing plastics material granulate, the processing plant comprising:
 a screw machine;
 an electric drive device for driving the screw machine;
 a metering device for feeding a plastics material to be processed into the screw machine;
 a granulating device arranged downstream of the screw machine in a conveying direction of the plastics material, wherein the granulating device comprises a valve for feeding granulating water; and
 a control device, wherein the control device is configured such that:
 the screw machine is drivable by means of the drive device;
 the metering device is activatable to feed plastics material to be processed into the screw machine;
 at least one conveying position of the plastics material in the screw machine is determinable by evaluating at least one measuring signal determined for the processing plant; and
 the granulating device is activatable depending on the at least one determined conveying position, wherein a starting time $T_0$ for starting a predefined process for putting the granulating device into operation is determinable with the aid of the at least one measuring signal by means of the control device and the valve for feeding granulating water is activatable proceeding from the starting time $T_0$ at a time interval $\Delta T_W$, wherein the time interval $\Delta T_W$ is definable such that the granulating water arrives in the granulating device substantially simultaneously with the molten plastics material and such that the granulating device is put into operation safely.

2. A processing plant according to claim 1, wherein a cutting mechanism of the granulating device is activatable proceeding from the starting time $T_0$ at a time interval $\Delta T_G$.

* * * * *